United States Patent [19]

Fristedt

[11] Patent Number: 4,700,046

[45] Date of Patent: Oct. 13, 1987

[54] CONTROL DEVICE FOR VEHICLE IN-SEAT HEATER

[75] Inventor: Tommy Fristedt, Bankeryd, Sweden

[73] Assignee: AB Mekania-Verken, Mullsjo, Sweden

[21] Appl. No.: 913,456

[22] Filed: Sep. 30, 1986

[30] Foreign Application Priority Data

Oct. 7, 1985 [SE] Sweden .................................. 8504652

[51] Int. Cl.$^4$ ............................................. H05B 1/02
[52] U.S. Cl. ..................................... 219/202; 219/492; 219/528; 219/497; 165/41
[58] Field of Search ................ 219/441, 493, 492, 497, 219/501, 202, 203, 528, 279, 529, 522; 165/41, 42

[56] References Cited

U.S. PATENT DOCUMENTS

| 2,927,189 | 3/1960 | Purpura | 219/441 |
| 3,594,547 | 7/1971 | Quinn | 219/202 |
| 3,692,979 | 9/1972 | Wise | 219/493 |
| 4,520,258 | 5/1985 | Gromann | 219/202 |
| 4,590,359 | 5/1986 | Mobius | 219/202 |
| 4,602,147 | 7/1986 | Gell | 219/506 |

Primary Examiner—M. H. Paschall
Attorney, Agent, or Firm—Dennison, Meserole, Pollack & Scheiner

[57] ABSTRACT

In known heat-emitting units (1) for car seats the unit (1) is heated to a set temperature and once this has been reached the temperature in the unit (1) oscillates around that set. This is a drawback since, after a certain amount of oscillation, the heat becomes too high and the setting must be altered. According to the invention the voltage supply is cut by means of a recording member (7), after a predetermined period of oscillation.

9 Claims, 4 Drawing Figures

CONTROL DEVICE FOR VEHICLE IN-SEAT HEATER

BACKGROUND OF INVENTION

The present invention relates to a device for a heat-emitting unit for connection to an electric voltage source. In this type of unit a thermostat device can be used to maintain a certain predetermined temperature. When this has been reached, the temperature in the unit will oscillate about the predetermined set temperature, the thermostat alternating between on and off position. If a graph is plotted for the temperature in relation to the time after the temperature in the unit has reached the value set, it is found that a curve is obtained having the nature of a sine wave. The positive parts of the curve represent the time periods when the thermostat is disconnected and the negative parts of the curve represent the time periods when the thermostat is switched on. It might also be said that, after reaching the set temperature, a number of positive and negative amplitudes follow, having certain duration. The duration of the amplitudes is dependent on the surrounding temperature prevailing around the heat-emitting unit. Under certain circumstances the continuance of alternating temperature amplitudes after the set temperature has been reached for an indefinite period, i.e. as long as the heat-emitting unit is connected to an electric voltage source, may be a drawback.

Heat-emitting units are widely used for seats in transport means such as cars, aircraft, boats or the like. Heat-emitting units may be placed both in the seat and in the backrest and may consist of several units, generally connected in series with each other. The units may either be in the form of pads to be placed on top of existing seats, or they may be built-in to both seat and backrest. For reasons of health, heat-emitting units are necessary in transport means since a cold seat may cause illness in the person using it. This is the reason for using heat-emitting units provided with thermostat devices. The temperature is set at, say, 37° C. and the seat and backrest are quickly heated. Once the desired temperature has been reached, the temperature will oscillate about the value set and it has been found that, after a certain time, the human body finds the set value to be unpleasantly high and it must therefore be reduced to about 32° C., a temperature experienced as pleasant. At a pleasant temperature the human body also emits a certain amount of heat which is generally sufficient to keep the seat and backrest at a temperature experienced as pleasant. There is thus also another alternative to altering the heat in the seat, and that is to cut the voltage supply to the heat-emitting unit or units in the seat, after a certain period at full heat.

SUMMARY OF INVENTION

The present invention relates particularly to seats in transport means and is intended to disconnect the voltage supply after a predetermined number of temperature oscillations after the set temperature has been reached. This occurs when the total duration of one or other of the amplitudes has reached a predetermined value, this being stipulated by a recording member.

The recording member can be brought to an initial position or a final position. In the initial position the recording member influences a circuit breaker for the supply of voltage to assume closed position. In the final position, however, the recording member causes said circuit breaker to assume open position.

The recording member can be moved from one position to the other with the aid of a capacitor which is in charged condition when the recording member assumes its initial position. Said capacitor is gradually discharged over the duration of the amplitude.

Instead of a capacitor to bring the recording member from one position to the other, a counter can be used which operates between two different settings.

It is advantageous to utilize control devices which, when the voltage is switched on for the heat-emitting unit, sets the recording member in its initial position.

Said control means may also be designed so that when the prevailing temperature in the heat-emitting unit falls a predetermined number of degrees below the set temperature, the recording member will automatically be brought to its initial position with the circuit breaker for the thermostat disconnected and the voltage source connected.

The latter feature offers a heat-emitting unit for vehicle seats which is fully automatic and requires no after-adjustment. A heat-emitting unit can immediately be connected to a voltage source when the voltage is switched on by means of an ignition key. The heat-emitting unit is then brought as quickly as possible to the set temperature. A certain time after, the current to the heat-emitting unit will be broken due to the setting on the recording member. In the event of the temperature falling a predetermined number of degrees below the value set, voltage will again be supplied to the heat-emitting unit due to the cooperation between the control unit and the recording member.

A suitable design for the thermostat in a heat-emitting unit according to the invention is an operational amplifier having a voltage divider with two permanent resistors connected to one input and a voltage divider with a rheostat, by means of which the desired temperature is set, connected to the other input. A temperature-sensitive element is also arranged in the heat-emitting unit. The temperature-sensitive member may consist of an NTC resistor which has high value at low temperature and low value at high temperature.

The control member may also consist of an operational amplifier to one input of which voltage is supplied from the operational amplifier in the thermostat itself, and to the other input of which a voltage divided is connected. The voltage-divider resistor determines the temperature below set temperature, at which the recording member shall be brought to its initial position.

In the above, said operational amplifier may be of type 741 or 326.

Additional features characterising the present invention are revealed in the following description.

BRIEF DESCRIPTION OF DRAWINGS

The present invention will be described in more detail with reference to the accompanying drawings in which.

DETAILED DESCRIPTION OF DRAWINGS

Figure 1:
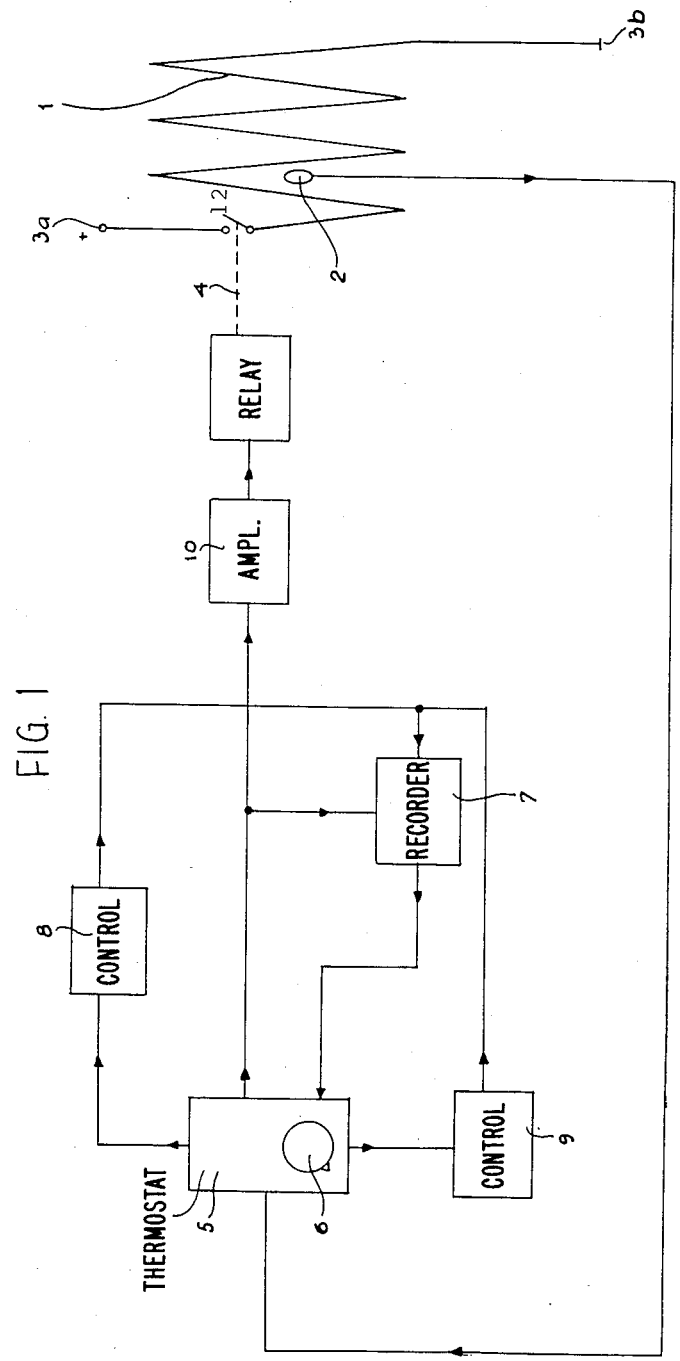
FIG. 1 shows a basic circuit diagram for a heat-emitting unit, having a thermostat device including the present invention.
Figure 3:
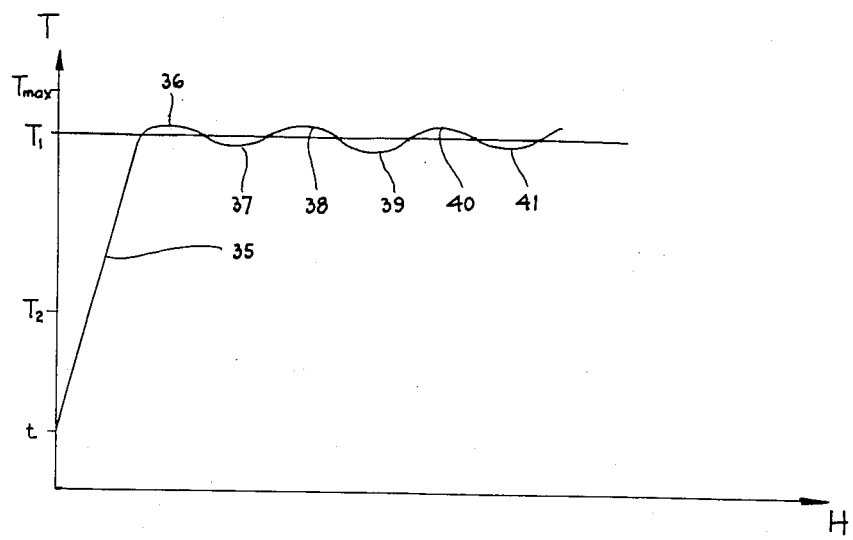
FIG. 3 shows a temperature curve for the heating process in a heat-emitting unit.
Figure 4:
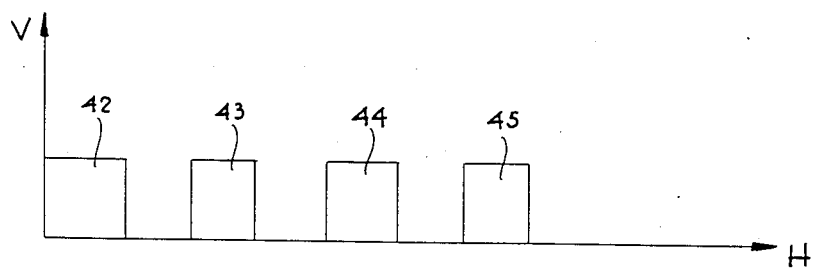
FIG. 4 shows the variation in voltage supplied after the set temperature has been reached.

FIG. 1 is a basic circuit diagram for a heat-emitting unit together with a thermostat device. These two parts are designed to be included in a vehicle with one or more heat-emitting units. The voltage source has a voltage of 12 V. A heating pad 1 is fitted into the seat or backrest of a chair and may consist of a number of electric conductors designed to emit heat when a current flows through them. The conductors are preferably arranged between two plastic layers. The conductors are connected to a voltage source 3a and 3b. Close to the electric wires is a temperature-sensitive resistor 2, which may be an NTC resistor. Other temperature-sensitive bodies may be used which are connected electrically to a thermostate 5. The voltage supply to the electric conductors in the heat pad 1 is controlled by means of a relay 4 with circuit breaker 12. The thermostat 5 is provided with a setting knob 6 for setting the desired temperature the heat-emitting unit 1 shall reach. A control signal of DC character goes from the thermostat 5 to an amplifier 10 which is a conventional transistor amplifier, which supplies sufficient voltage to influence the relay 4. The maximum voltage which can be supplied to the relay 4 is 12 volts, i.e. the voltage available in the vehicle. The thermostat 5 is disconnected when the temperature set for heat-emitting unit 1 has been reached. When the unit has cooled down somewhat the thermostat will again be switched on and voltage will again be supplied to the heat-emitting unit 1. After the set temperature has been reached, the temperature will gradually cool to below the set temperature, whereupon the thermostat will be switched on again. After achieving the set temperature, therefore the temperature of the heat-emitting unit will vary in the form of a sine wave with positive and negative amplitudes. The thermostat is disconnected during positive amplitudes and connected during negative amplitudes. The high temperature will therefore prevail continuously and this is a drawback since after some time a person will find it too hot and will wish to reduce the temperature. To avoid this adjustment process a recording means 7 is provided which has an initial position and a final position. The recording means cooperates with a circuit breaker at the thermostat 5, said circuit breaker being closed when the recording means is in its initial position and assuming open position when the recording means is in its final position. The recording means 7 is designed to measure the duration of consecutive positive amplitudes occurring after the set temperature has been reached. These periods are added together and when the total reaches a certain predetermined value, the recording means is forced to its final position. The recording means is switched from final position to initial position when a heating process is started for a heat-emitting unit. A heating process is illustrated by the curve shown in FIG. 3 in which the horizontal axis represents the time H and the vertical axis represents the temperature T. The curve portion 35 illustrates the actual heating process and during this heating process the recording means 7 is switched to its initial position. When the set temperature $T_1$ has been reached, the curve shows clearly that the temperature in the heat-emitting unit 1 will vary in the form of a sine curve with positive curve portions 36, 38 and 40 and with negative curve portions 37, 39 and 41. During the positive curve portions the thermostat is switched off and during the negative curve portions the thermostat is connected.

When the temperature $T_1$ has been reached, current impulses 43, 44 and 45 will be supplied to the heat-emitting unit. The recording means 7 adds the duration of the positive curve portions which start at the curve part 36, and when the added duration reaches a perdetermined value the recording means 7 will have reached its final position and the thermostat 5 will thus be disconnected. The total duration need not comprise the total duration for whole curve portions but the last totalled duration may constitute the first part of each curve portion. The changeover from initial position to final position may be effected by means of a capacitor which is gradually discharged or by means of a counter acting between two different settings.

A control device 8 is used to bring the recording means 7 into its initial position at the start of a heating process. The control device 8 is also able to bring the recording means 7 to its initial position when the temperature in the heat-emitting unit 1 deviates a certain amount from the set temperature. In the block diagram 9 is a device for setting the recording means 7 to its initial position.

A thermostat device with heat-emitting unit can be connected directly to a voltage source via the ignition key of a motor vehicle. The entire process is then carried out automatically without any alteration of the setting whatsoever, i.e. when the ignition key is turned, the heating process commences and an oscillating process will follow when the set temperature has been reached. Said oscillating process is terminated by the thermostat being disconnected after a certain duration, i.e. after a certain number of oscillations. After that the heat-emitting unit will not be connected again until the temperature has dropped a certain number of degrees below the temperature set. The present invention thus offers an entirely automatic heating system for the seats in a vehicle. The predetermined set temperature usually has a value of 37° C. and it should be obvious that the device for setting the predetermined temperature may be replaced by a permanent unit consisting of a resistor, for instance, thus eliminating any need to give any thought to heating the seat. Experience has shown that it is sufficient if the circuit breaker for the thermostat is disconnected three and a half minutes after the heat-emitting unit has reached the predetermined temperature.

Figure 2:
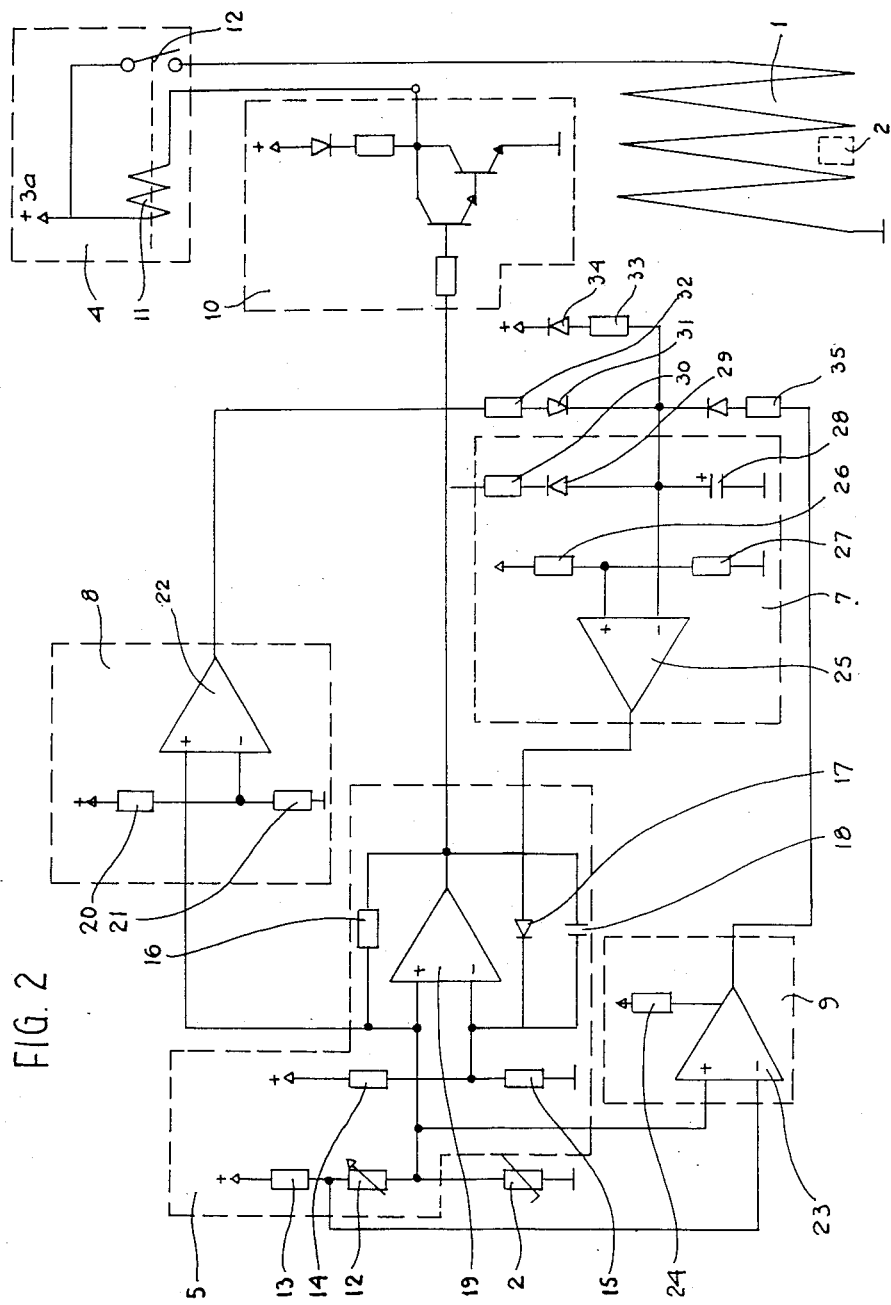
FIG. 2 shows a detailed circuit diagram for the invention.

FIG. 2 shows the construction of parts 4, 5, 7, 8, 9 and 10.

The thermostat device 5 consists of an operational amplifier 19 with a voltage divider 14,15 connected to one input. The voltage divider generally consists of two equal resistors and is connected to the 12 volt voltage source of the vehicle. A voltage divider consisting of a heat-sensitive resistor 2 is connected to the other input of the operation amplifier and is located in the heat-emitting unit 1. The voltage divider also comprises a rheostat 12 enabling the desired temperature to be set on the heat-emitting unit, as well as another resistor 13. The voltage divider is connected to the voltage source of the vehicle. Between one of the operational amplifier and its output is a resistor 16 and between the other input of the operational amplifier and its output is a capacitor 18. The operational amplifier output emits a direct voltage which varies depending on the input voltages. For an output signal to be obtained, there must be a difference between the voltages to the two inputs.

The control device 8 also comprises an operation amplifier 22. One input of this is connected to a voltage divider with resistors 20 and 21 and the other input to the second input of the thermostat operational amplifier 19. The operational amplifier 22 emits an output signal when the voltage difference is between the two inputs. At the start of a heating process the voltage difference between the two inputs of operational amplifier 22 will be so large that an output signal of direct voltage character is obtained. This signal ceases when the predetermined temperature value has been reached in the heat-emitting unit 1. In the event of the temperature in the heat-emitting unit 1 falling to a predetermined temperature $T_2$, the operational amplifier 22 will again emit a signal. The emission of a signal of the latter type is determined by the values of the two resistors 20 and 21. The difference between $T_1$ and $T_2$ can thus be stipulated at a desired value.

The signal from the operational amplifier 22 is supplied to a recording means 7. This is performed via a resistor 32 and a rectifier 31 and the signal is utilized to charge a capacitor 28 connected to the negative pole of the voltage source and to the output of the operational amplifier 19 in the thermostat 5 via a rectifier 36 and a resistor 30. The capacitor 28 is also connected to one input of an operational amplifier 25. A voltage divider composed of resistors 26 and 27 is connected to the other input. Said first input to the operational amplifier 25 is connected via a resistor and a rectifier to the positive pole of the voltage source. The signal from the operational amplifier 22 is used to charge capacitor 28 and once this has been charged the operational amplifier 25 ceases to emit any output signal. The capacitor 28 is gradually discharged and, when fully discharged, the operational amplifier 25 will emit a signal of such magnitude to the operational amplifier 19 that it will cease to emit any output signal. The member 9 comprises an operational amplifier 23 whose inputs are connected to each end of the rheostat 12. An asymmetry trimming resistor 24 is also connected to the operational amplifier. Setting the rheostat 12 causes the member 9 to emit a signal via a resistor 35 and a rectifier 36 to the capacitor 28 ensuring that it is constantly charged. The output of operational amplifier 19 of thermostat 5 is connected to a conventional transistor amplifier 10, its output being connected to a relay 4 containing a coil and a contact 12.

During a heating process the operational amplifier 19 will continue to emit an output signal until a predetermined set temperature has been reached. Once this has occurred, no output signal will be obtained and the capacitor 28 will therefore discharge as long as the operational amplifier emits no output signal. However the thermostat will be connected and disconnected periodically after a predetermined set temperature has been reached. The capacitor 28 will thus be gradually discharged every time there is an absence of voltage supply to the heat-emitting unit 1. When the capacitor is fully discharged the operational amplifier 25 will emit a signal which blocks the operational amplifier 19 from emitting any signal. The size of the capacitor 28 determines how many times the temperature may vary in the heat-emitting unit once the predetermined temperature $T_1$ has been reached. The recording member 7 can again be forced to its initial position, i.e. the member has again charged the capacitor 28, when the temperature of the heat-emitting unit 1 has fallen a predetermined number of degrees below temperature $T_1$, i.e. to temperature $T_2$. At this temperature difference, the operational amplifier 22 will receive input signals causing it to emit an output signal. A heating process is thus again initiated and will only terminate when the predetermined temperature $T_1$ has been reached. Thereafter, a certain time interval after this, the current supply to the heat-emitting unit 1 will again be disconnected.

I claim:

1. Control means for a heat-emitting unit incorporated in a vehicle seat, said unit comprising at least one heat-emitting electric conductor built into a seat or backrest of a vehicle seating assembly, a source of electric voltage connected to said heat-emitting conductor, switch means interposed between the said conductor and said voltage source, adjustable thermostat means operably connected to said switch means for running the temperature adjacent said conductor and opening or closing said switch means to maintain a pre-set temperature, said temperature adjacent said conductor oscillating about said pre-set temperature due to switching on and off of said voltage source to provide positive and negative pulses, and pulse recording means connected to said thermostat means to actuate said switch means to disconnect the voltage source from the conductor after a predetermined number of registered pulses of one polarity.

2. A control means as defined in claim 1, wherein the pulse recording means (7) includes a capacitor (28) which is initially charged and finally discharged.

3. A control means as defined in claim 1 wherein the pulse recording means (7) includes a counter having an initial setting and finally a different setting.

4. A control means as defined in claim 3, and further including a control device (8) which brings said pulse recording means into its initial setting when the heat emitting unit is connected to the voltage source.

5. A control means as defined in claim 4 wherein the control device (8) brings the pulse recording means to its initial setting when the temperature in the heat-emitting unit falls a predetermined value below the preset temperature.

6. A control means as defined in claim 3 and further including means (9, 12) to keep the pulse recording means at its initial setting.

7. A control means as defined in claim 4 wherein the thermostat means includes an operational amplifier having a first and second input, a first voltage divider having two fixed resistors (14, 15) connected to the first input and a second voltage divider having a variable resistor (12) connected to the second input, said variable resistor functioning to preset the temperature and said second voltage divider also including a temperature sensitive resistor (2) situated in proximity to the heat emitting unit.

8. A control means as defined in claim 7, wherein the control device (8) includes an operational amplifier (22), two inputs, the first input being connected to one of the inputs of the operational amplifier of the thermostat means, a further voltage divider having two resistors (20, 21) connected to the second input of the control device amplifier, the values of said resistors (22, 21) determining the temperature below the set temperature at which the pulse recording means is brought to its initial setting.

9. A control means as defined in claim 1, wherein said seat or backrest is located in a transport vehicle such as a motor car, aircraft, or boat, and further including an ignition lock on the transport between the heat-emitting unit and the voltage source.

* * * * *